United States Patent [19]
Scholz et al.

[11] Patent Number: 5,634,380
[45] Date of Patent: Jun. 3, 1997

[54] ARTICULATED FITTING FOR SEATS WITH ADJUSTABLE BACKREST IN PARTICULAR FOR MOTOR VEHICLE SEATS

[75] Inventors: Grit Scholz, Remscheid; Dirk Angermann, Cologne; Thorsten Nottebaum, Remscheid, all of Germany

[73] Assignee: Keiper Recaro GmbH & Co., Remscheid, Germany

[21] Appl. No.: 412,078

[22] Filed: Mar. 28, 1995

[30] Foreign Application Priority Data

Mar. 31, 1994 [DE] Germany .................. 44 11 215.7

[51] Int. Cl.$^6$ .................................................. B60N 2/22
[52] U.S. Cl. ................................... 74/528; 297/362
[58] Field of Search ................ 74/527, 528, 553; 297/362; 267/161, 164, 165, 159, 150

[56] References Cited

U.S. PATENT DOCUMENTS

| | | | |
|---|---|---|---|
| 5,005,907 | 4/1991 | Caillol | 297/362 |
| 5,154,475 | 10/1992 | Kafitz | 297/362 |
| 5,312,158 | 5/1994 | Wittig et al. | 297/362 |
| 5,438,732 | 8/1995 | Engels et al. | 297/362 |

*Primary Examiner*—Charles A. Marmor
*Assistant Examiner*—Mary Ann Battista
*Attorney, Agent, or Firm*—McAulay Fisher Nissen Goldberg & Kiel, LLP

[57] ABSTRACT

The articulated fitting has a stationary articulated part associated with the seat part and a swivelable articulated part associated with the backrest. These articulated parts are connected with one another via an adjusting shaft. An adjusting and locking device which is constructed as a gear unit and determines the position of the two articulated parts relative to one another is provided. The adjusting shaft has an eccentric portion for supporting one articulated part, this eccentric portion being formed by two wedge segments which are inclined relative to one another and engage regions of a driver of the adjusting shaft, by a driver arm engaging between the narrow sides of the wedge segments, and by a torsion spring which spreads apart the broad sides of the wedge segments with its spring legs. Therefore, the invention minimizes the play occurring between the driver arm and wedge segments as a result of operation and manufacture.

14 Claims, 7 Drawing Sheets

ARTICULATED FITTING FOR SEATS WITH ADJUSTABLE BACKREST IN PARTICULAR FOR MOTOR VEHICLE SEATS

BACKGROUND OF THE INVENTION

1. Field of the Invention

The invention is directed to an articulated fitting for seats with adjustable backrest, in particular motor vehicle seats, in which a stationary articulated part associated with the seat part and a swivelable articulated part associated with the backrest are connected with one another via an adjusting shaft, with an adjusting and locking device which is constructed as a gear unit and determines the position of the two articulated parts relative to one another, the adjusting shaft having an eccentric portion for supporting one articulated part, this eccentric portion being formed by two wedge segments which are inclined relative to one another and engage regions of a driver of the adjusting shaft, by a driver arm engaging between the narrow sides of the wedge segments, and by a torsion spring which spreads apart the broad sides of the wedge segments with its spring legs.

2. Description of the Related Art

In a known articulated fitting of the type mentioned above, the driver has a sleeve, one end of which is connected so as to form one piece with a plate or disk projecting beyond the outer diameter of the sleeve. A driver arm which is spaced radially from the sleeve and engages over certain portions thereof is formed integral with this disk and engages between the narrow sides of two wedge segments whose outer surfaces support a bearing bore hole of one articulated part comprising a spur gear, for instance, while the inner surface area of the wedge segments is supported on a collar of the other articulated part, which collar supports the sleeve of the driver. Owing to operating and manufacturing tolerances, the two wedge segments are spread apart to varying degrees by the spring legs of a torsion spring which act upon the broad sides of the wedge segments so that the radian measurement of the space accommodating the driver arm, which is constructed as an annular segment and provided for acting upon the narrow sides of the wedge segments, is more or less extensive. When the radian measurement between the narrow sides of the wedge segments is small, the play existing between the stop faces of the driver arm and the narrow sides of the wedge segments is consequently smaller than it would if the radian measurement between the narrow sides of the wedge segments were greater due to occurring tolerances. Therefore, when the adjusting movement is initiated in the driver, the user must overcome a more or less considerable idle path before the driver arm acts upon one of the narrow sides of a wedge segment. This occurs with every change in the rotating direction of an adjusting movement manually initiated in the driver. This idle path effect is perceived by the user as irritating. Further, rattling noises occur when the vehicle is operated. Moreover, precision adjustment is difficult.

OBJECT AND SUMMARY OF THE INVENTION

Since there is no way to eliminate play resulting from unavoidable tolerances, the primary object of the present invention consists in rendering the idle path extensively imperceptible to the user.

This object is met according to the invention in that the driver has a resistance element acting on the torsion spring. When a rotating movement is initiated in the driver, a resistance element of this type cooperating with the torsion spring ensures, via the elasticity of the torsion spring, that resistance will be perceived during manual actuation already before the driver arm, depending on the rotating direction, contacts one of the two narrow sides of a wedge segment so that the user does not perceive an idle path or the idle path is shortened to the maximum possible extent. Either the driver or the torsion spring can have an oblique plane, while the complementary piece (torsion spring or driver) has a shape which contacts the oblique plane and is moved in such a way that it slides along the oblique plane accompanied by spring loading when traversing the idle path. In a first embodiment example of the invention, the driver advantageously has a resistance element constructed as a cam projection at the outer surface of its driver arm, wherein the cam projection contacts a radially inwardly projecting indentation of the torsion spring and the indentation is arranged roughly opposite the spring legs. By way of the cam projection of the driver arm, the indentation of the torsion spring causes this driver to rotate in such a way that one side of the driver arm contacts a narrow side of a wedge segment. When rotation is effected in the contacting direction of the driver, the idle path effectively does not occur since the driver arm already contacts the narrow side of the wedge segment in question. When rotating in the opposite direction, the cam projection rotates under the indentation of the torsion spring so that the user immediately perceives resistance upon traversing the idle path, this resistance continuing as an adjusting resistance when the driver arm comes into contact with the narrow side of a wedge segment.

In another embodiment example of the invention, the driver is advantageously enlarged at the outer surface area of its driver arm to form a resistance element provided with a groove, wherein a radially inwardly projecting indentation of the torsion spring located roughly opposite the spring legs engages in the groove, i.e., the driver and torsion spring are in a positive engagement or material-against-material engagement approximately opposite the spring legs of the torsion spring. In this solution, upon initiating the rotating movement in the driver, a pretensioning is built up in the spring due to the simultaneous driving of the torsion spring in the rotating direction of the initiated rotating movement, this pretensioning being perceived by the user as a resistance which finally makes a transition into the adjusting resistance when the driver arm finally comes into contact with the respective narrow side of a wedge segment depending on the selected rotating direction. The same effect can be achieved in another development of the invention when the driver has, at the outer surface area of its driver arm, a resistance element which is constructed as a cam projection and is engaged in a positive connection by a radially outwardly directed bulge in the torsion spring located roughly opposite the spring legs.

In another embodiment form of the invention, the driver advantageously has, at its side located diametrically opposite its driver arm, a compensating finger which engages between the spring legs of the torsion spring and forms the resistance element. In this solution, no idle paths occur in the extreme cases, i.e., when there is maximum play between the narrow sides of the wedge segments and the driver arm in one case and when there is no play between the narrow sides of the wedge segments and the driver arm in the other case. In the first case, this is due to the fact that the compensating finger immediately provides for a perceptible resistance when a rotating movement is initiated in the driver arm in that the compensating finger contacts the spring legs. In the other case, owing to the contact of the narrow sides of the wedge segments at the driver arm, the rotating movement is immediately transmitted to the wedge segment in question and is accordingly immediately perceived by the user as resistance. In the unfavorable intermediate position in which there is play between the spring legs and compensating finger as well as between the driver arm and the narrow sides of the wedge segments, a shorter idle path is possible, although this idle path can amount to a half or a fourth of the theoretical maximum play given unfavorable play ratios. Accordingly, the idle path is substantially reduced in this embodiment form. If the resistance element is expanded by a springing region filling up half the idle path, the idle path can be rendered completely unnoticeable.

In the embodiment forms mentioned above, the torsion spring can rotate slightly relative to the resistance element, i.e., relative to the driver, at the start of the adjusting phase since the connection between the resistance element and the torsion spring is subject to play or, due to a springing region at the resistance element, there is no immediately effective introduction of force in the arm of the torsion spring which is acted upon. In order to improve the invention in this respect, it is suggested that the resistance element be arranged at the driver so as to be spaced radially from the driver arm and that the torsion spring be secured at the resistance element in the region of the torsion spring located opposite the spring legs. In so doing, the resistance element is advantageously formed by three retaining fingers arranged next to one another at a distance in the circumferential direction, wherein the two outer retaining fingers support the torsion spring at its inner circumference and the inner retaining finger supports the torsion spring at its outer circumference.

In order to increase the force of the torsion spring acting on the wedge segments in the blocking state, the resistance element is constructed as a circular segment with a convex bulge which supports the torsion spring at the outer side by its end regions and is clamped between the driver arm and the end regions of the resistance element. However, since certain regions of the torsion spring are acted upon with greater force as a result, an advantageous further development of the invention provides that tangentially projecting supporting protrusions adjoin both sides of the driver arm at the driver and support the lower, inner circumferential portion of the torsion spring along a broad base, while the resistance element engages over the outer circumference of the torsion spring with two supporting thumbs arranged at a distance from one another so that the torsion spring is clamped between the supporting protrusions and the supporting thumbs. In order to prevent an increase in the adjusting moment when damping the idle path while at the same time achieving a high locking force of the wedge segments in the blocked position, the spring legs of the torsion spring which are drawn in radially are guided past one another in the outer circumferential region and, in each instance, act on the broad side of the wedge segment on the opposite side so as to press the wedge segments apart.

In order to limit the unlocking movement of the wedge segments and, on the other hand, to release the wedge segment which is not acted upon by the driver arm, stop protrusions which are conventionally arranged at the region of the driver adjacent to the swivel shaft are arranged at the broad sides of the wedge segments. However, in order to prevent the spring legs of the torsion spring from sliding off the broad sides of the wedge segments, the stop protrusion at the broad side of each wedge segment is arranged radially above the stop recess for the bent end of each spring leg of the torsion spring. In order to compensate for play in the spring legs with respect to their point of contact with the broad side of every wedge segment, the contact recess at the broad side of every wedge segment is expanded in the radial direction by at least 1.5 times the wire diameter of the torsion spring. After deformation of the spring, its expressed direction of force corresponds to the movement direction of the wedge segments. The ends of the torsion spring are accordingly supported at the respective wedge segment in such a way that they can be deflected without expenditure of force.

The invention is shown in embodiment examples in the drawings and explained more fully in the following.

DESCRIPTION OF THE PREFERRED EMBODIMENTS

Figure 1:
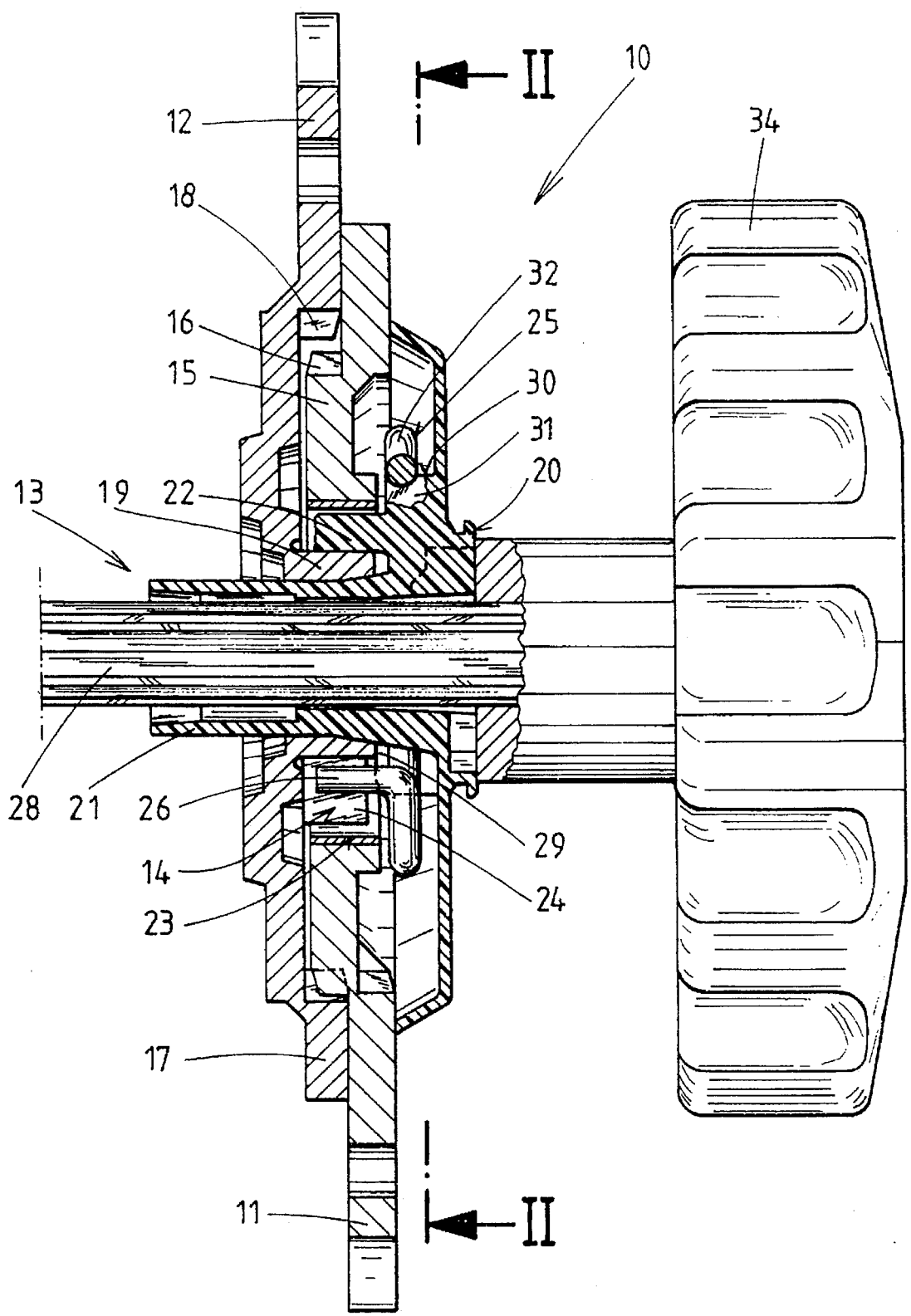
FIG. 1 shows the articulated fitting to be arranged on a side of a seat in vertical section.

An articulated fitting 10 shown in the drawings is arranged on both longitudinal sides of a seat between the seat part and the backrest and serves for continuous adjustment of the backrest relative to the seat part. A stationary articulated part 11 is connected with the seat part, while a swivelable articulated part 12 is associated with the backrest. The articulated parts 11 and 12 are connected with one another by a swivel shaft 13 having an eccentric portion 14. The swivel shaft 13 is also a structural component part of an adjusting and locking device constructed as a gear unit. This locking device comprises a spur gear 15 which is formed, for example, by stamping out of the articulated part 11 and has an external toothing 16 which meshes with the internal toothing 18 of a gear rim 17 of the articulated part 12, which gear rim 17 can also be formed, for example, by stamping. The diameter of the outside circle of the external toothing 16 is smaller than the diameter of the base circle of the internal toothing 18 by at least the depth of a tooth. Accordingly, the number of teeth of toothings 16 and 18 differs by at least one tooth, the internal toothing 18 having a greater number of teeth than the external toothing 16. The arrangement shown in FIGS. 1 and 2 is selected in such a way that the external toothing 16 can roll along the internal toothing 18.

A driver 20 which is constructed as a bush and encloses a hub 21 which is supported in turn in a drawn collar 19 of the articulated part 12 projecting on the side of the internal toothing is supported in the articulated part 12 concentrically to the internal toothing 18. The driver 20 has a driver arm 22 which is spaced radially from its hub 21 and engages over the drawn collar 19 in an intermediate space between the drawn collar 19 and a bearing bore hole 23 of the spur gear 15. Two wedge segments 24 are supported by their inner surfaces at the drawn collar 19 in the plane of the driver arm 22 and are supported by their outer surfaces at the bearing bore hole 23 of the spur gear 15. While the narrow end faces of the wedge segments 24 are located at a slight distance from the driver arm 22 in the locking position of the articulated fitting, the wide end faces of the wedge segments 24 are acted upon by the spring legs 26 of a torsion spring 25 so as to spread apart. Together with the drawn collar 19 of the articulated part 12, these wedge segments 24 produce an eccentric portion which is received in the bearing bore hole 23 of the articulated part 11. By means of the eccentric portion, the internal toothing 18 of the articulated part 12 is held in engagement with the toothing 16 of the spur gear 15 at the articulated part 11 in an extension of the highest point of the eccentric. In its center, the hub 21 of the driver 20 has a splined bore hole 27 receiving a transmission rod 28 with a splined profile in order to transmit the rotational movement initiated in one articulated fitting on one longitudinal side of the seat to the articulated fitting on the opposite longitudinal side of the seat. In the region of the wedge segments 24, a contact face 29 with wedge-segment-like contours adjoining the driver arm 22 is formed integral with the driver 20. However, the driver arm 22 projects beyond these contact faces 29.

A resistance element 30 which can be brought into a working connection with the torsion spring 25 is connected with the driver 20 in a stationary manner, this resistance element 30 being formed integral with the driver 20 in the embodiment examples shown in the drawing. Of course, this is not essential, and the resistance element 30 could also be connected with the driver in a different manner, e.g., by means of a tight fit, fasteners and the like.

Figure 2:
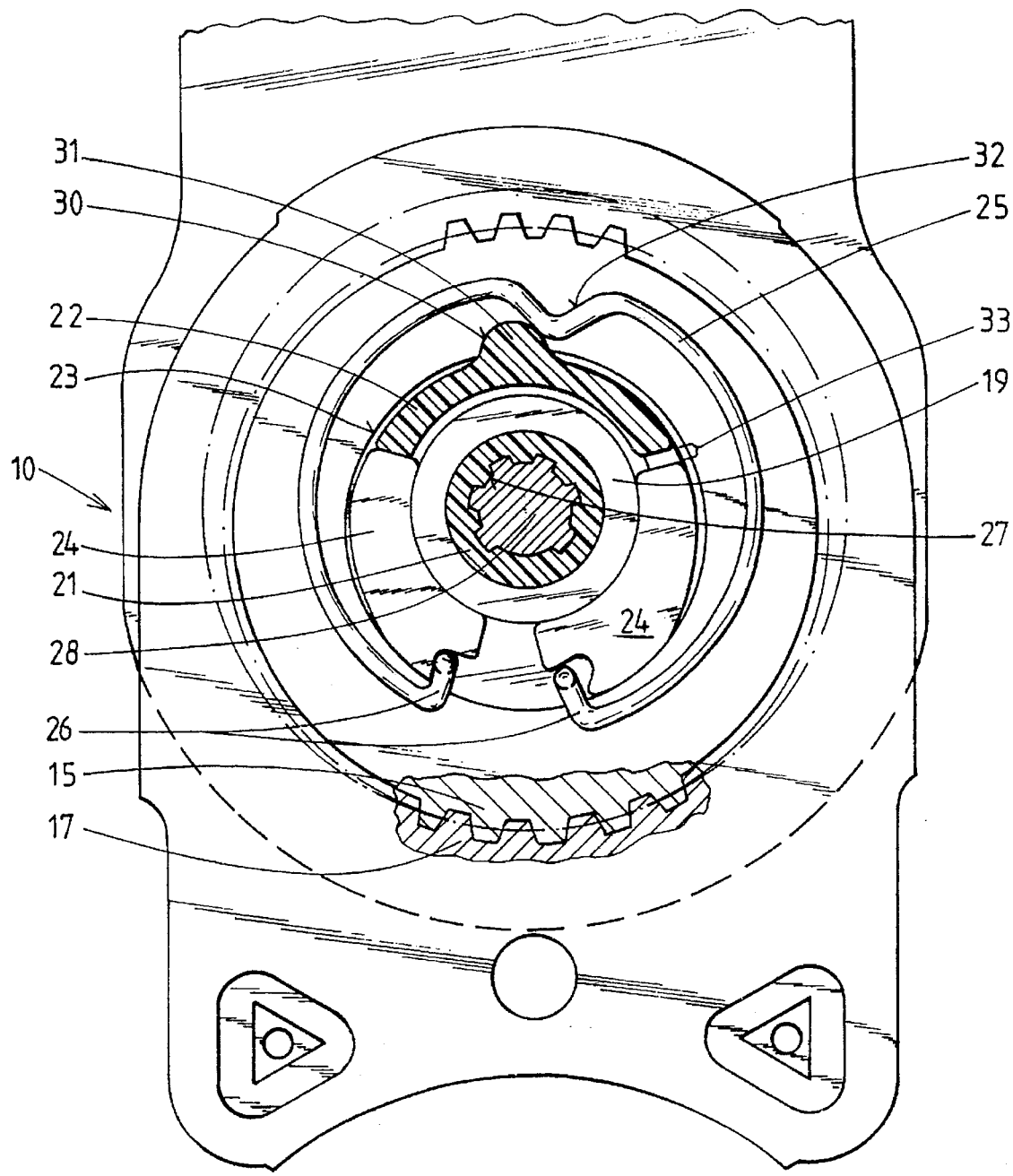
FIG. 2 shows a first embodiment example of this articulated fitting in a cross section according to line II—II of FIG. 1.

In the embodiment example shown in FIGS. 1 and 2, the resistance element 30 has a cam projection 31 arranged at the outer circumference of the driver arm 22. This cam projection 31 is shaped in such a way that it passes into the outer surface of the driver arm 22 at both sides via an oblique plane. The torsion spring 25 is supported at this cam projection 31 by a radially inwardly projecting indentation 32 which is located diametrically opposite the spring legs 26 of the torsion spring 25. The play 33 between the driver arm 22 and the narrow sides of the wedge segments 24, which on the one hand is caused by unavoidable manufacturing tolerances and on the other hand is necessary for operation, can be hidden without rattling noises in that the driver arm 22, in the position shown in FIG. 2, is held in contact with the narrow side of the wedge segment 24 arranged on the left-hand side by means of the left-hand slope of the indentation 32 of the torsion spring 25. If the driver arm 22 is then rotated in the counterclockwise direction as a result of a corresponding rotation of the driver 20, the driver arm 22 immediately acts upon the left-hand wedge segment 24 at the start of the rotating movement and releases this wedge segment 24 from its clamping connection between the drawn collar 19 and the bearing bore hole 23. However, if the driver arm 22 is rotated in the clockwise direction, the cam projection 31 is first rotated away under the indentation 32 of the torsion spring 25, wherein a springing action is exerted either by the springing cam projection 31 or the torsion spring 25 and the play 33 between the driver arm 22 and the right-hand wedge segment 24 is bridged. In either case, the user immediately notices resistance when manually actuating the handle 34 and receives the subjective impression of immediately initiating adjustment, although in the latter case this only begins after overcoming the play 33.

Figure 3:
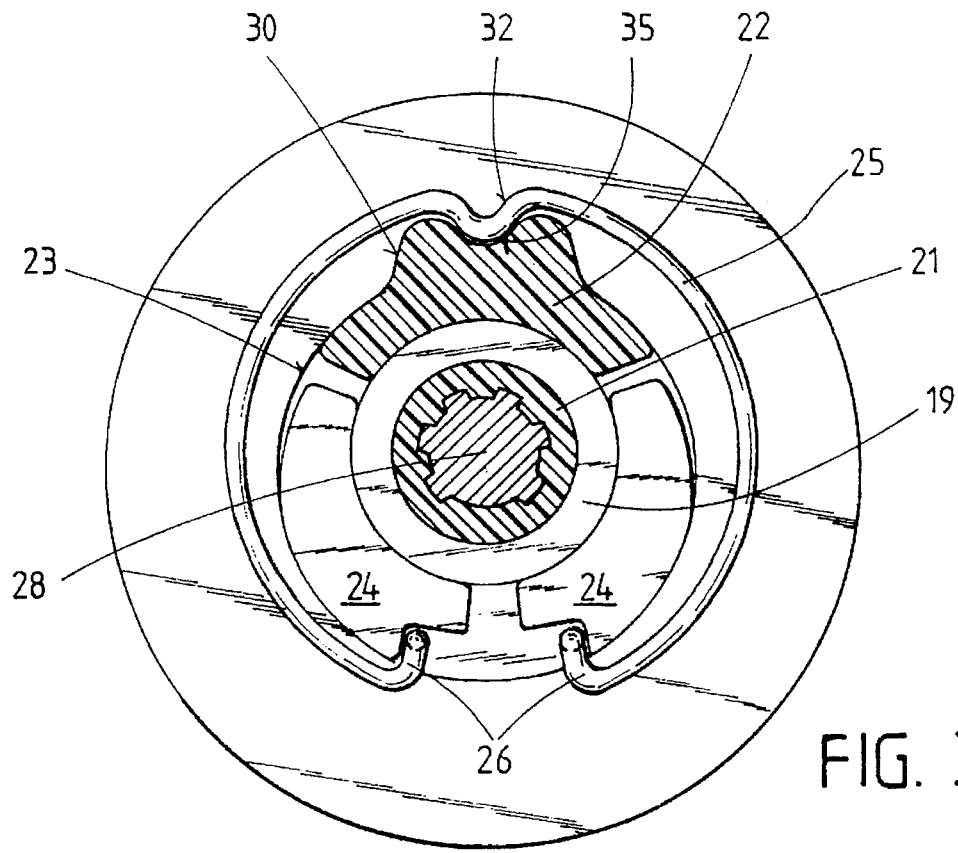
FIG. 3 shows another embodiment example of the subject of the invention in a view analogous to FIG. 2, but showing only those structural component parts essential to the invention.

In the embodiment example shown in FIG. 3, a projection which likewise functions as a resistance element 30 is arranged at the outer surface of the driver arm 22. At its highest point, this projection has a groove 35 in which the indentation 32 of the torsion spring 25 engages so as to close it. If a rotating movement in either direction is then initiated in the driver arm 22, the tangential springing action of the torsion spring 25 ensures that resistance will be perceived immediately, since the indentation 32 of the torsion spring 25 is held in the groove 35 of the driver arm. The resistance to rotation is effective until the play between the stop faces of the wedge segments 24 on the narrow side and the stop face of the driver arm 22 is overcome.

Figure 4:
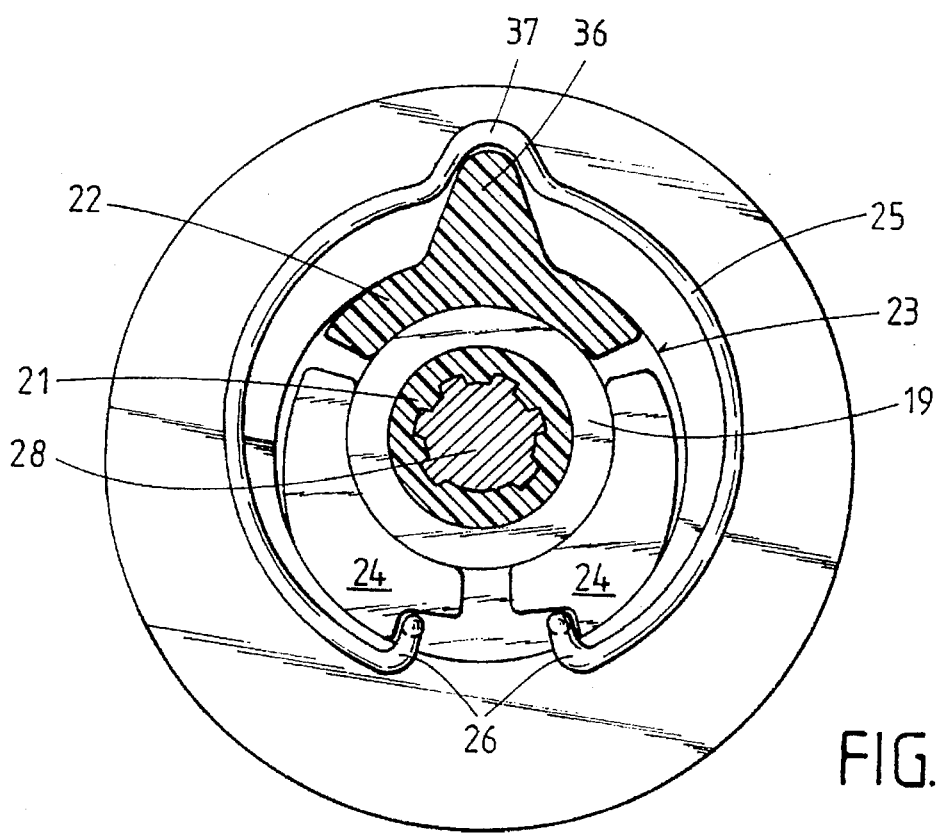
FIG. 4 shows an embodiment example which has been modified in comparison to FIG. 3 in the same view as that shown in FIG. 3.

In the embodiment example shown in FIG. 4, there is a positive engagement or material-on-material engagement between the driver arm 22 and torsion spring 25 in that the torsion spring 25 has a radially outwardly projecting bulge 37 in which a cam projection 36 engages so as to close it, this cam projection 36 being formed integral with the driver arm 22.

Figure 5:
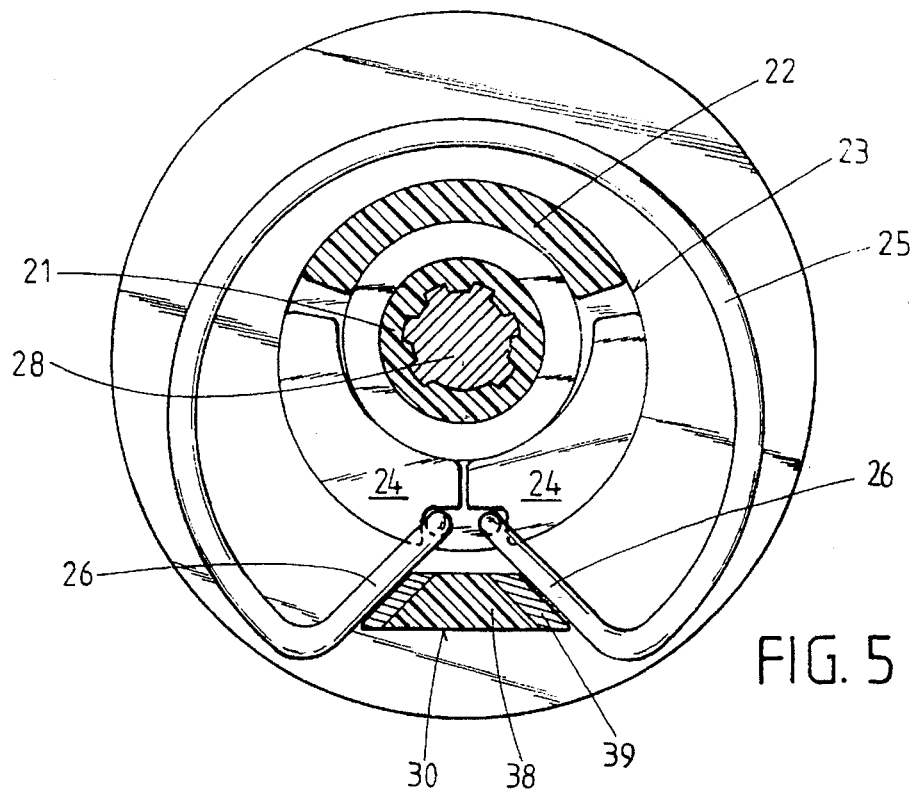
FIG. 5 shows another embodiment example of the subject of the invention in which a compensating finger is arranged between the spring legs and there is maximum play between the driver arm and the wedge segments in a view analogous to FIGS. 3 and 4, wherein only those structural component parts essential to the invention are shown.
Figure 6:
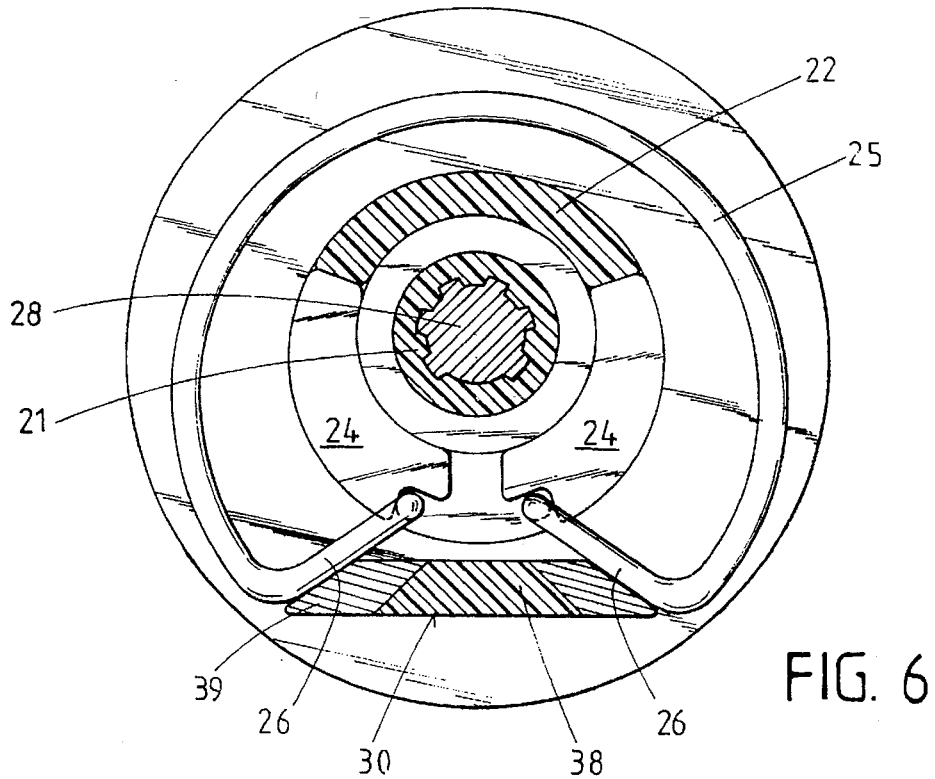
FIG. 6 shows the embodiment example shown in FIG. 5 in which there is no play between the driver arm and wedge segments due to manufacturing tolerances.

In the embodiment example shown in FIGS. 5 and 6, the resistance element 30 is likewise connected with the driver in a stationary manner, but, in contrast to the embodiment examples described above, is constructed on the side located diametrically opposite the driver arm 22 as a compensating finger 38 which projects from the driver. The compensating finger 38 can have a springing region (39) at its two tangential end faces. This compensating finger 38 engages between the spring legs 26 of the torsion spring 25 and in extreme cases, i.e., when the manufacturing tolerances accumulate to the extent that maximum play occurs between the narrow sides of the wedge segments 24 and the driver arm 22, is supported directly at the spring legs 26 (FIG. 5).

In the other extreme case shown in FIG. 6, i.e., when there is no play 33 due to manufacturing tolerances, the narrow sides of the wedge segments 24 are supported at the longitudinal sides of the driver arm 22. In both cases, the user does not perceive any idling path at all, since, in the example shown in FIG. 5, one of the two spring legs 26 is acted upon immediately upon introducing a rotational movement in the driver via the compensating finger 38 and, via the springing action of the torsion spring 25, a resistance is noticeable until one or the other wedge segment 24 comes to rest at a longitudinal side of the driver arm 22 and the actual adjusting movement of the articulated fitting commences at this point. In the other case—shown in FIG. 6—one of the two wedge segments 24 is acted upon via the driver arm 22 when a rotational movement is initiated in the driver so that, again in this case, resistance is noticeable in the adjusting movement and the adjustment of the articulated fitting begins immediately. Depending on the actual tolerances, however, positions of the wedge segments 24 intermediate to those shown in FIGS. 5 and 6 are also possible, so that play is possible between the narrow sides of the wedge segments 24 and the driver 22 as well as between the compensating finger 38 and the respective spring leg 26 in the absence of a springing region 39 at the compensating finger 38. However, owing to the geometric ratios, play occurring between the narrow side of the wedge segments 24 and the driver 22 and between the compensating finger 38 and the spring legs 25 can amount to only half of the theoretical maximum play. Such play, which may actually occur, then takes place between the longitudinal sides of the driver arm 22 and the narrow sides of the wedge segments 24 as well as between the compensating finger 38 and the spring legs 26. In every other case, the magnitude of play at the locations mentioned above varies so that either the driver arm 22 first comes into contact with a narrow side of a wedge segment 24, depending on rotating direction, or a lateral boundary of the compensating finger 38 comes into contact with one of the two spring legs 26 of the torsion spring 25. The clearance between the compensating finger 38 and the spring legs 26 can be filled up by the springing region 39, if present, which can be formed, e.g., by vulcanized rubber.

Figure 7:
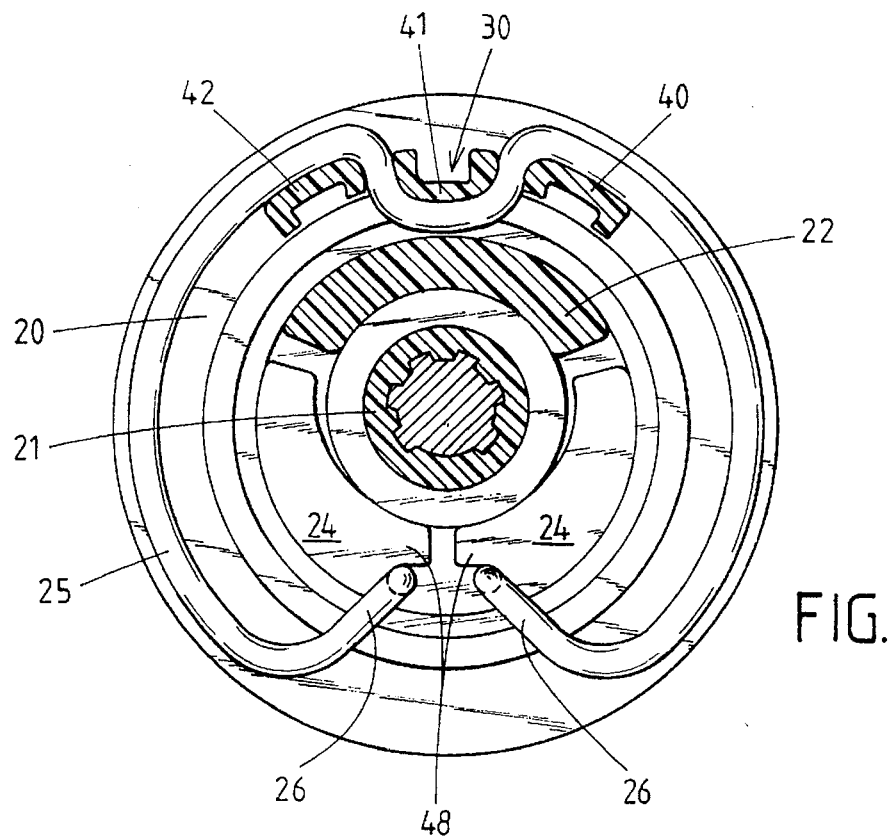
FIG. 7 shows the central region of another embodiment example of the articulated fitting in a sectional view analogous to FIG. 2.

In the embodiment example shown in FIG. 7, the resistance element 30 is arranged at a distance radially from the driver arm 22 at the disk part of the driver 20 in that three retaining fingers 40, 41 and 42 which are arranged next to one another at a distance in the circumferential direction across from the highest point of the eccentric formed by the wedge segments 24 project away from this disk part. Each retaining finger 40 to 42 has a U-shaped cross section and the legs of the retaining fingers 40 and 42 face inward radially, while the legs of retaining finger 41 are directed outward radially. The spacing between retaining fingers 40 and 41 on the one hand and retaining fingers 41 and 42 on the other hand corresponds at least to the wire diameter of the torsion spring 25 which is shaped in such a way that it engages over retaining fingers 40 and 42 on the outside as seen in the radial direction and engages the middle retaining finger 41 on the inside as seen in the radial direction.

Figure 8:
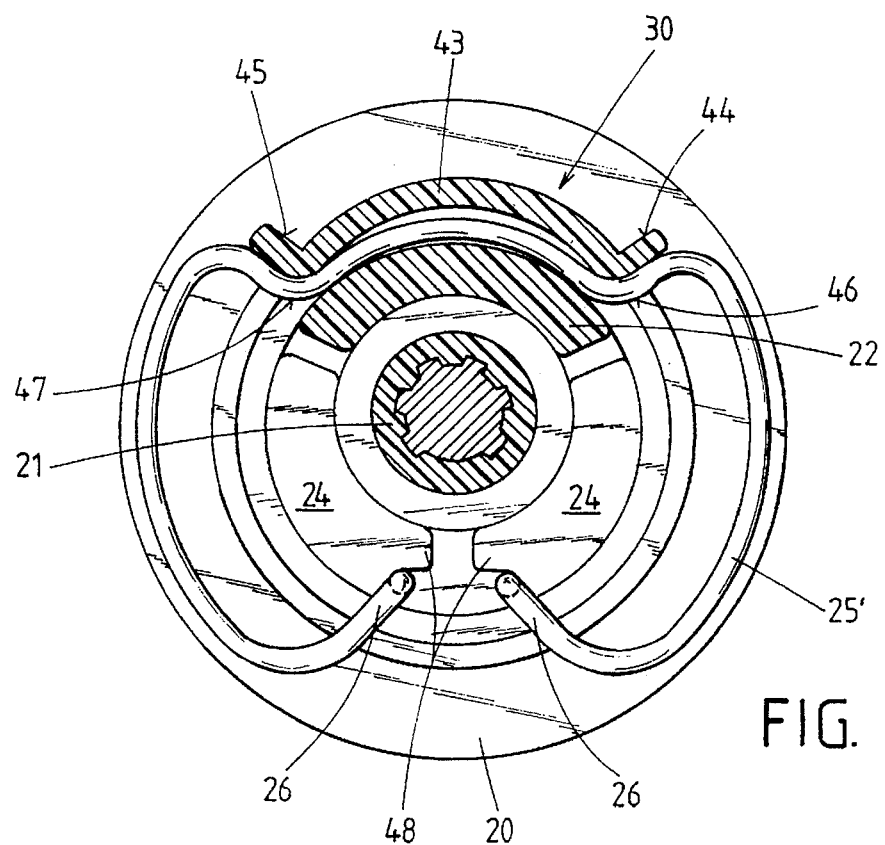
FIG. 8 shows the central region of another embodiment example of an articulated fitting in a view analogous to FIG. 7.

In the embodiment example shown in FIG. 8, the resistance element 30 is constructed as a circular segment 43 with a convex bulge, likewise arranged at a distance from the driver arm 22 of the driver 20. The two end regions 44 and 45 of the circular segment are angled radially outward and, at this location, the spacing between their inner surfaces and the outer surface of the driver arm 22 is such that the wire thickness of the torsion spring 25' fits between them. Whereas the torsion springs 25 in the embodiment forms mentioned above have only one indentation 32 which is located opposite the highest point of the eccentric and directed either inward or outward, torsion spring 25' of the embodiment example shown in FIG. 8 is provided with two radially inwardly directed indentations 46 and 47 which are at equal distances from the location located opposite the highest point of the eccentric. The region between the indentations 46 and 47 of the torsion spring 25' is drawn in radially compared to the rest of the circumferential region and engages between the diver arm 22 and the circular segment 43 having the convex bulge, but contacts neither the driver arm 22 nor the circular segment 43.

In all of the embodiment examples described above, the broad sides of the wedge segments have stop protrusions 48 which are arranged below the spring legs 26 in the radial direction. These stop protrusions 48 serve in particular to release the wedge segment not driven by the driver arm 22 in that, at the start of the adjusting phase after traversing a small rotational angle, the stop protrusion 48 of the driven wedge segment acts on the stop protrusion 48 of the wedge segment which is not driven by the driver arm 22 and causes the latter to rotate in the disengagement direction. Further, the stop protrusions 48 serve to position the hook ends of the spring legs 26.

Figure 10:
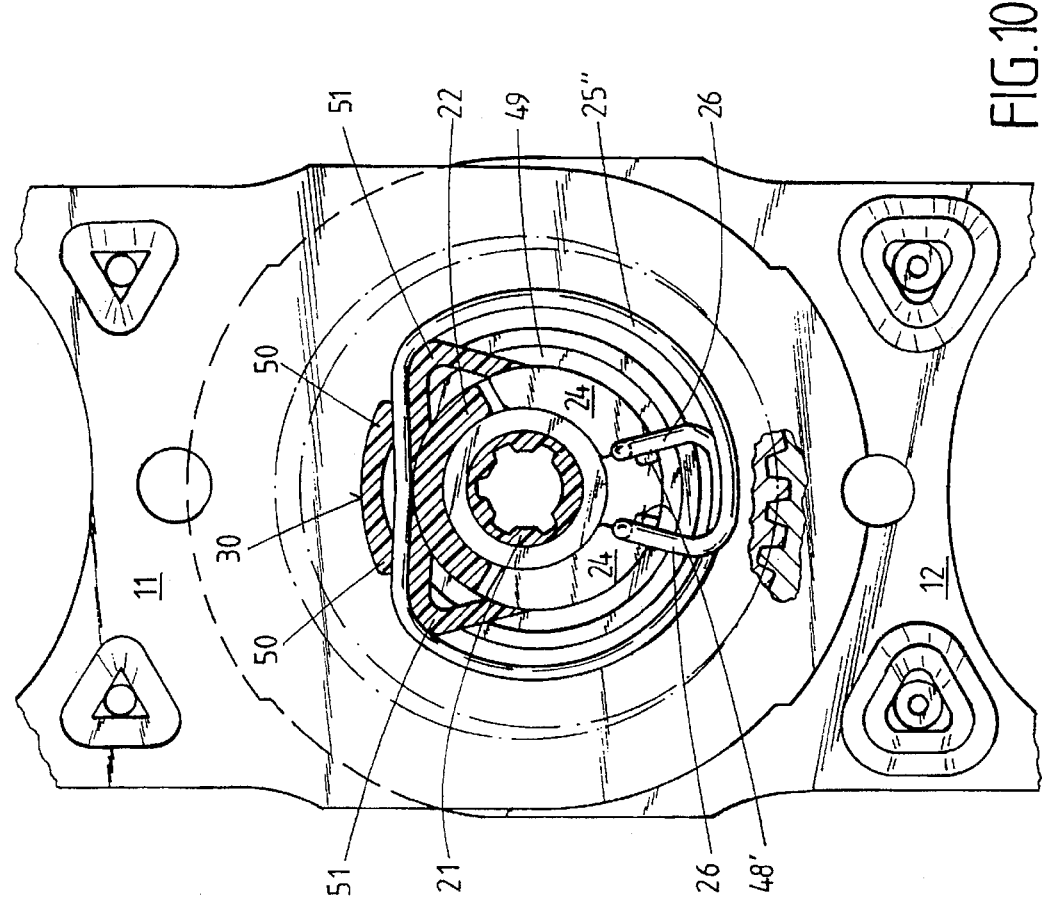
FIG. 10 shows the articulated fitting shown in FIG. 9 in section along line X—X of FIG. 9.
Figure 9:
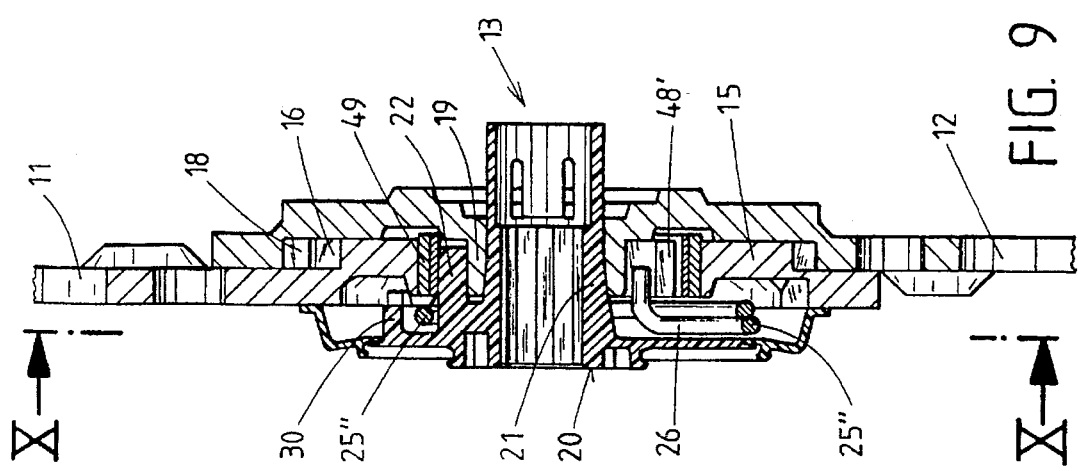
FIG. 9 shows another embodiment example of an articulated fitting in vertical section.

The construction of the articulated fitting shown in FIGS. 9 and 10 is basically identical to that shown in the description of FIG. 1, so that the same reference numbers are used for identical structural component parts in this embodiment form, as well. In contrast to the embodiment form shown in FIGS. 1 and 2, a bearing bush 49 is inserted into the bearing bore hole 23 of the articulated part 11. The resistance element 30 is also arranged at the disk part of the driver 20 at a distance to the driver arm 22 in this embodiment form and has, at both sides opposite the highest point of the eccentric, two supporting thumbs 50 which are arranged at a distance from one another and support the outer side of the torsion spring 25" on the side located opposite the highest point of the eccentric. At either side of the location of the driver arm 22 situated across from the highest point of the eccentric, tangentially projecting supporting protrusions 51 emerge from this driver arm 22 and contact the inner side of the torsion spring 25". In contrast to the torsion springs 25 and 25' mentioned above, the spring legs 26 of the torsion spring 25" which are drawn in are guided past one another in the outer circumferential region and act upon the broad side of the wedge segment 24 of the opposite side so as to spread these wedge segments apart (FIG. 10). The region of the torsion spring 25" lying opposite the spring legs 26 is flattened in shape in such a way that it fits between the supporting thumbs 50 and the supporting protrusions 51 at the driver 20 and is held between the supporting thumbs 50 and supporting protrusions 51.

In the embodiment example shown in FIGS. 9 and 10, the stop protrusions 48' serving to release the wedge segment which is not carried along by the driver arm 22 at the start of the adjusting movement are arranged radially along the bent portion of the spring legs 26 and directly adjoin the bearing bush 49. This prevents the spring legs 26 from sliding down the broad side of the wedge segments 24 and jumping on the bearing bush 49.

Figure 11:
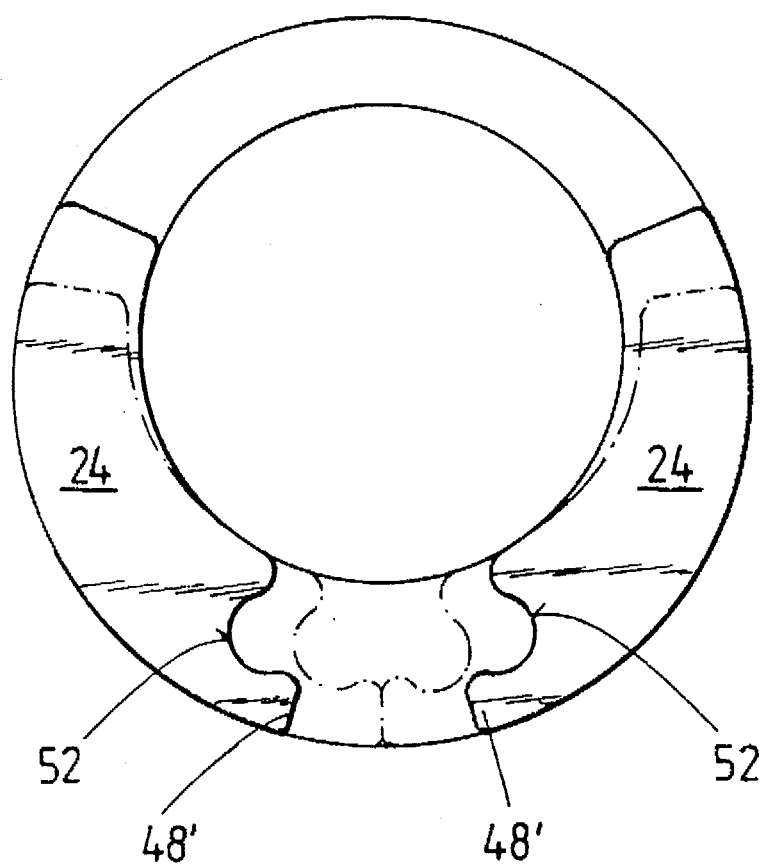
FIG. 11 shows the modified wedge segments in the embodiment example according to FIGS. 9 and 10 in a view analogous to FIG. 10.

As can be seen in particular from FIG. 11, each of the broad sides of the wedge segments 24 has a contact recess 52 for the bent end of each spring leg 26. These contact recesses 52 at the broad side of each wedge segment 24 are expanded radially by at least 1.5 times the wire diameter of the torsion spring 25". In this way, a compensating movement can be provided for the end of the spring, when loaded or not loaded, at the start of the adjusting movement so that radial force components can be held within limits.

As was already mentioned, the embodiment forms described and shown above are given only as examples illustrating the subject of the present invention which is in no way limited thereby. Rather, there are many possible modifications and other constructions of the subject of the invention. Moreover, all of the novel features mentioned in the description and/or shown in the drawings are substantial to the invention, even when not expressly claimed in the present patent claims.

What is claimed is:

1. In an articulated fitting for a seat with an adjustable backrest, in which a stationary articulated part associated with the seat and a swivelable articulated part associated with the backrest are connected with one another via an adjusting shaft, with an adjusting and locking device which is constructed as a gear unit and determines the position of the two articulated parts relative to one another, the adjusting shaft having an eccentric portion for supporting one of the articulated parts, this eccentric portion being formed by two wedge segments which are inclined relative to one another and engage regions of a driver of the adjusting shaft, by a driver arm engaging narrow sides of the wedge segments, and by a torsion spring which spreads apart broad sides of the wedge segments with attached spring legs, the improvement comprising that:

the driver has a resistance element acting directly on the torsion spring.

2. The articulated fitting according to claim 1, wherein one of the driver and the torsion spring has an oblique plane, and the complementary piece has a shape which contacts the oblique plane and is moved in such a way that it slides along the oblique plane accompanied by spring loading when traversing an idle path.

3. The articulated fitting according to claim 1, wherein the resistance element at the driver is connected with the torsion spring in a positive engagement or in a material-against-material engagement, this connection being arranged approximately opposite to the spring legs.

4. The articulated fitting according to claim 1, wherein the resistance element is constructed as a cam projection at an outer surface of the driver arm, this cam projection contacting a radially inwardly projecting indentation of the torsion spring, wherein the indentation is arranged roughly opposite the spring legs.

5. The articulated fitting according to claim 1, wherein the driver is enlarged at an outer surface area of the driver arm to form the resistance element provided with a groove, wherein a radially inwardly projecting indentation of the torsion spring located roughly opposite the spring legs engages in the groove.

6. The articulated fitting according to claim 1, wherein the driver has, at an outer surface area of the driver arm, the resistance element which is constructed as a cam projection and is engaged in a positive connection by a radially outwardly directed bulge of the torsion spring located roughly opposite the spring legs.

7. The articulated fitting according to claim 1, wherein the driver has, at its side located diametrically opposite the driver arm, a compensating finger which engages between the spring legs of the torsion spring and forms the resistance element.

8. The articulated fitting according to claim 1, wherein the resistance element is arranged at an outer radial distance from the driver arm at the driver and the torsion spring is secured at the driver by the resistance element at its region located opposite the spring legs.

9. The articulated fitting according to claim 1, including a stop protrusion at the broad side of each said wedge segment arranged radially above a stop recess for a bent end of each said spring leg of the torsion spring.

10. The articulated fitting according to claim 1, wherein the resistance element is constructed as a circular segment with a convex bulge which supports the torsion spring at an outer side by its end regions and is clamped between the driver arm and the end regions of the resistance element.

11. The articulated fitting according to claim 1, wherein tangentially projecting supporting protrusions adjoin the driver at both sides of the driver arm and support a lower, inner circumferential portion of the torsion spring along a broad base, while the resistance element engages over an outer circumference of the torsion spring with two supporting thumbs arranged at a distance from one another so that the torsion spring is clamped between the supporting protrusions and the supporting thumbs.

12. The articulated fitting according to claim 1, wherein a contact recess at the broad side of each said wedge segment is expanded in a radial direction by at least 1.5 times the wire diameter of the torsion spring.

13. The articulated fitting according to claim 1, wherein the resistance element is formed by three retaining fingers arranged next to one another at a distance in a circumferential direction, wherein two of the retaining fingers support the torsion spring at its inner circumference and one of the retaining fingers supports the torsion spring at its outer circumference.

14. The articulated fitting according to claim 13, wherein the spring legs of the torsion spring which are drawn in radially are guided past one another in an outer circumferential region and, in each instance, act on the broad side of the wedge segment on the opposite side so as to press the wedge segments apart.

* * * * *